United States Patent
Shin

(10) Patent No.: US 6,332,524 B1
(45) Date of Patent: Dec. 25, 2001

(54) SHIFT LOCK DEVICE FOR VEHICLE

(75) Inventor: Dae-Cheol Shin, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/427,848

(22) Filed: Oct. 26, 1999

(30) Foreign Application Priority Data

Jul. 5, 1999 (KR) .................................................. 99-26892

(51) Int. Cl.$^7$ .................................................. B60K 41/26
(52) U.S. Cl. ..................... 192/220.2; 192/220; 74/483 K
(58) Field of Search ................. 192/220, 220.2, 192/220.3; 74/473.3, 483 R, 483 PB, 483 K

(56) References Cited

U.S. PATENT DOCUMENTS

| | | | | |
|---|---|---|---|---|
| 4,096,930 | * | 6/1978 | Viscardi ............................ | 192/220.2 |
| 4,905,802 | | 3/1990 | Gotoh ................................ | 192/4 A |
| 4,966,262 | * | 10/1990 | Mieczkowski ..................... | 192/220.2 |
| 5,379,872 | * | 1/1995 | Dorr et al. ........................ | 192/220.4 |
| 5,493,932 | * | 2/1996 | Plocher ............................. | 192/220.4 |

* cited by examiner

*Primary Examiner*—Charles A Marmor
*Assistant Examiner*—Saúl Rodríguez
(74) *Attorney, Agent, or Firm*—Christie, Parker & Hale, LLP

(57) ABSTRACT

A shift lock device for vehicle, the device comprising: a selector lever shiftable to lots of mode set-up positions including parking, neutral and driving positions; a lock pin movable disposed at the selector lever for engaging to or disengaging from the engagement holes; and lock release means interlocking for the selector lever to be shifted from the parking position to the neutral position or from the neutral position to the parking or driving position when a brake pedal is not depressed, while moving the lock pin to release an engaged state between the lock pin and the engagement holes when the brake pedal is depressed, such that the selector lever is individually locked at the parking position or at the neutral position when the brake pedal is not depressed, and when the brake pedal is depressed, the selector lever can be shifted from the parking position to the drive position direction, or from the neutral position to the other set-up positioning direction, to thereby prevent an occurrence of sudden acceleration.

4 Claims, 4 Drawing Sheets

SHIFT LOCK DEVICE FOR VEHICLE

BACKGROUND OF THE INVENTION

1. Field of Invention

The present invention relates to a shift lock device for vehicle, and more particularly to a shift lock device for vehicle constructed and arranged to expand an application range of sudden acceleration safety set-up mode, thereby preventing an occurrence of sudden acceleration beforehand.

2. Description of the Prior Art

In a conventional shift lock device, as illustrated in FIG. 1, an engagement of a lock cam 26 is constituted by a notch formed at an edge of lock arm of the lock cam 26, and a proximal end of a lock cable 68 is connected to a brake pedal 32 while a distal end of the lock cable 68 is extended near to the lock cam 26. The lock cable 68 is slidably inserted at a distal end portion into a guide sleeve 72, while a lock pin 74 is fixed to a distal end of a cable 122.

The lock cable 68 is moved backward and forward according to actuation of the brake pedal 32. A lock pin 74 is protrudes from or is withdrawn to a guide sleeve 72 according to reciprocation of the lock cable 68.

In the conventional shift lock device, when the brake pedal 32 is not depressed, the lock pin 74 protrudes from the guide sleeve 72 to thereby be fixed in a notch portion of the lock cam 26, by which the lock pin 74 prevents rotation of the cam 26, and locks the cam at a lock position illustrated in FIG. 1. When the brake pedal 32 is depressed, the lock pin 74 is withdrawn along with the lock cable 68 to thereafter be detached from the notch portion.

At this time, when a selector lever 10 is established at a parking position (P) and the brake pedal 32 is not depressed, the lock cam is locked at a lock position by a lever lock mechanism 34, while the selector lever 10 maintains a state where the selector lever 10 cannot be shifted to a neutral position (N) from the parking position (P).

In other words, shifting operation of the selector lever 10 is only possible when the brake pedal 32 is depressed. A prior art of a shift lock device is disclosed in a U.S. Pat. No. 4,905,802.

The shift lock thus described has a notch portion of the lock cam 26 engage or disengage the lock pin 74 operated by the brake pedal 32 in order to prevent an erroneous operations of the brake pedal and acceleration pedal, such that the selector lever 10 is only shifted and locked from the parking (P) position to the neutral (N) position.

However, there is a problem in the conventional shift lock device thus described in that the device only enables a selector lever to shift and lock from the parking (P) position to a neutral (N) position, such that, when the selector lever 10 is shifted from the neutral (N) position to other set-up mode position and a sudden acceleration is to occur, the shift lock function cannot be performed to thereby cause a unsafe driving.

SUMMARY OF THE INVENTION

The present invention is disclosed to solve the aforementioned problem and it is an object of the present invention to provide a shift lock device for vehicle adapted to shift-lock a selector lever from a parking position direction to a drive position direction or from a neutral direction to other set-up position direction when a brake pedal is not depressed while the selector lever is shift-lock at a parking position or a neutral position, thereby expanding a range of sudden acceleration safety application mode for prevention in advance of occurrence of the sudden acceleration.

In accordance with the object of the present invention, there is provided a shift lock device for vehicle, the device comprising:

- a selector lever shiftable to lots of mode set-up positions including parking, neutral and driving positions;
- a lock pin movable disposed at the selector lever for engaging to or disengaging from the engagement holes; and
- lock release means interlocking for the selector lever to be shifted from the parking position to the neutral position or from the neutral position to the parking or driving position when a brake pedal is not depressed, while moving the lock pin to release an engaged state between the lock pin and the engagement holes when the brake pedal is depressed.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
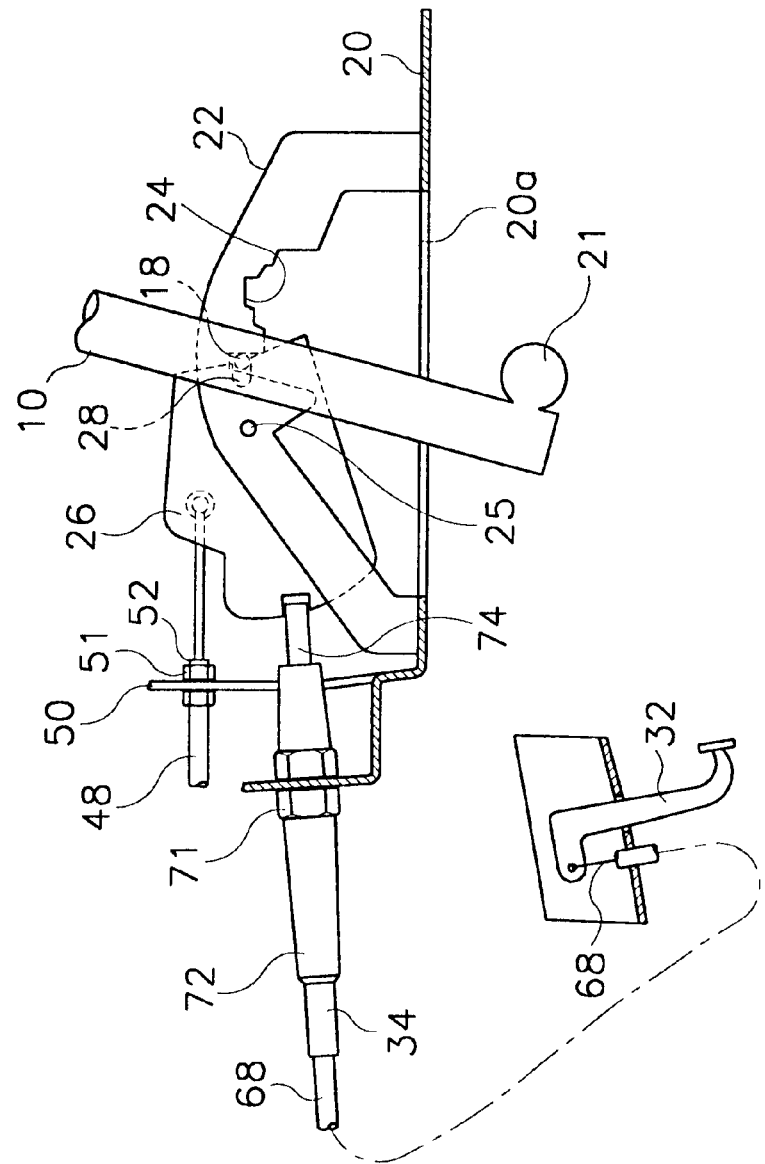
FIG. 1 is a schematic drawing of a shift lock device according to the prior art.
Figure 2:
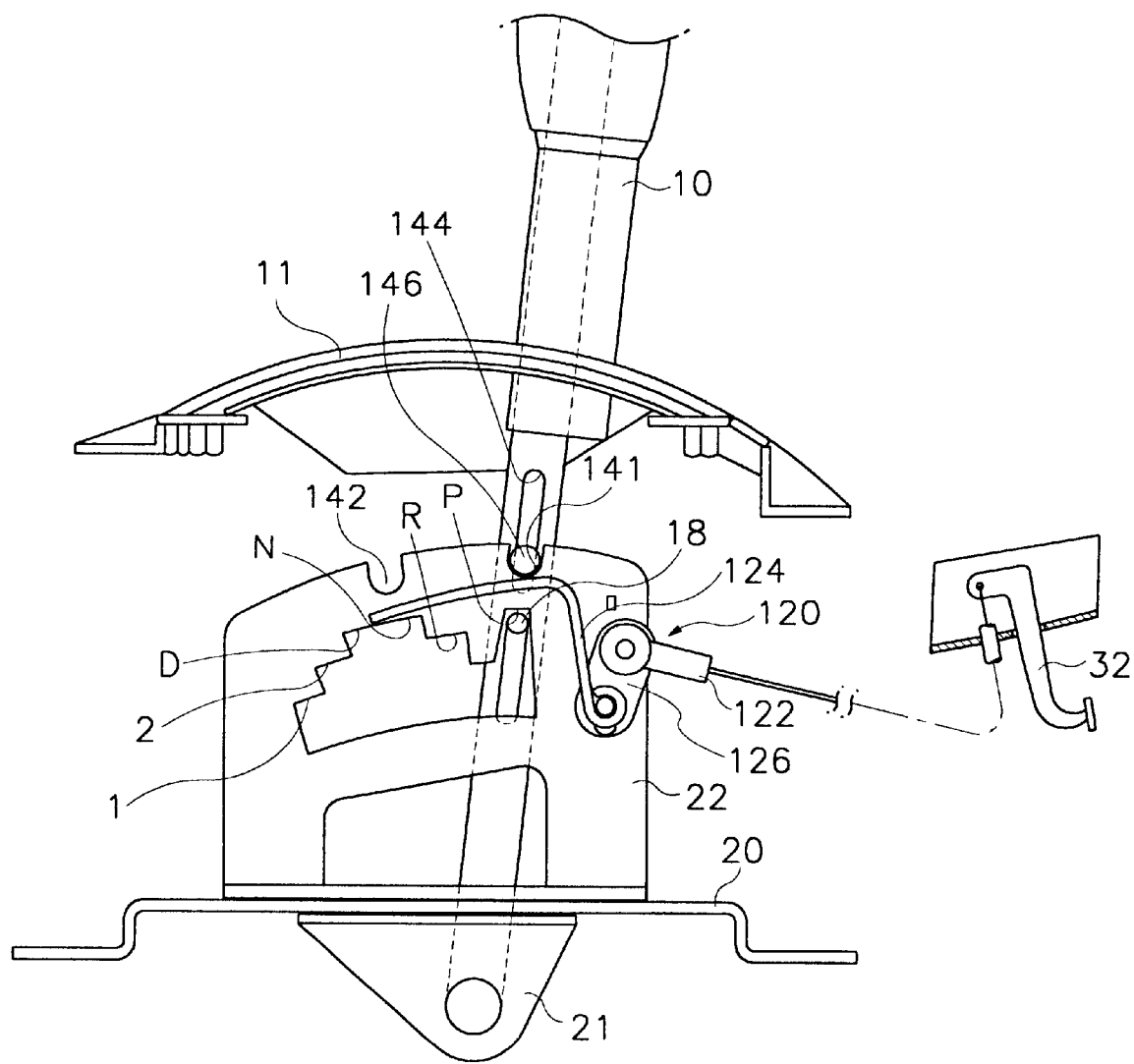
FIG. 2 is a schematic drawing of a shift lock device according to the present invention.

Now, preferred embodiment of the present invention will be described in detail with reference to the accompanying drawings.

Reference numeral 32 is a brake pedal moved by depressing force of a driver and 11 is a shift set-up mode display member where a plurality of shifting set-up modes (P, R, N, D, 2, 1) are displayed for a selector lever 10 to display a shifted set-up mode during shifting of a vehicle. Reference numeral 22 is a detent plate connected by a detent pin 18 of the selector lever 10 in order to maintain the selector lever 10 at a desired shifting set-up position.

Furthermore, a brake pedal 32 is disposed with lock release means 120 for blocking a connection release of the detent pin 18 when the brake pedal 32 is not depressed to thereby lock the selector lever 10 at a parking position (P) and for releasing a shift lock of the selector lever 10 from the locked parking position (P) when the brake pedal 32 is depressed.

The detent plate 22 is provided thereon with a first engagement hole 141 disposed at a position facingly corresponding to a parking set-up position (P) and a second engagement hole 142 disposed at a position facingly corresponding to a neutral set-up position (N). The selector lever 10 is arranged for vertical movement with a lock pin 146 to be engaged to or disengaged from first and second engagement holes 141 and 142.

Of course, the lock release means 120 is adopted to interlock the selector lever 10 from shifting from the parking position (P) to other set-up position, by way of example to a neutral position (N) and also to interlock the selector lever 10 from shifting from the neutral position (N) to parking position (P) or to the drive position (D).

The lock release means 120 is also applied to vertically move the lock pin 146 for release an engaged state of the lock pin 146 and the first engagement hole 141 when the lock pin 146 is located at the parking position (P) and the brake pedal 32 is depressed, and is used to vertically move the lock pin 146 for release an engaged state of the lock pin 146 and the second engagement hole 142 when the lock pin 146 is situated at the neutral position (P) and the brake pedal 32 is depressed.

Furthermore, the lock release means 120 includes a cable 122 connected at one end thereof to the brake pedal 32, a release lever 124 pivoting to release engagement with the lock pin 146 and the fist engagement hole 141 or the lock pin 146 and the second engagement hole 142 according to the movement of the cable 122, and a connecting member 126 hinged at one end thereof to the detent plate 22 while connected at the other end thereof to the other end of the cable 122 so that the release lever 124 can be pivoted. The release lever 124 is made of spring steel such that a predetermined amount of depressing force can be absorbed by itself even though an excessive depressing force is applied to the brake pedal 32.

The lock pin 146 is mounted thereon with a supporting member 150 fixed inside the selector lever 10 at a predetermined interval from the lock pin 146, and a resilient member 151 fixed at one end thereof by the supporting member 150 and accommodated at the other end thereof on a resiliently movable member 153 in order to apply a resilient to the resiliently movable member 153 mounted at the lock pin 146.

Figure 4:
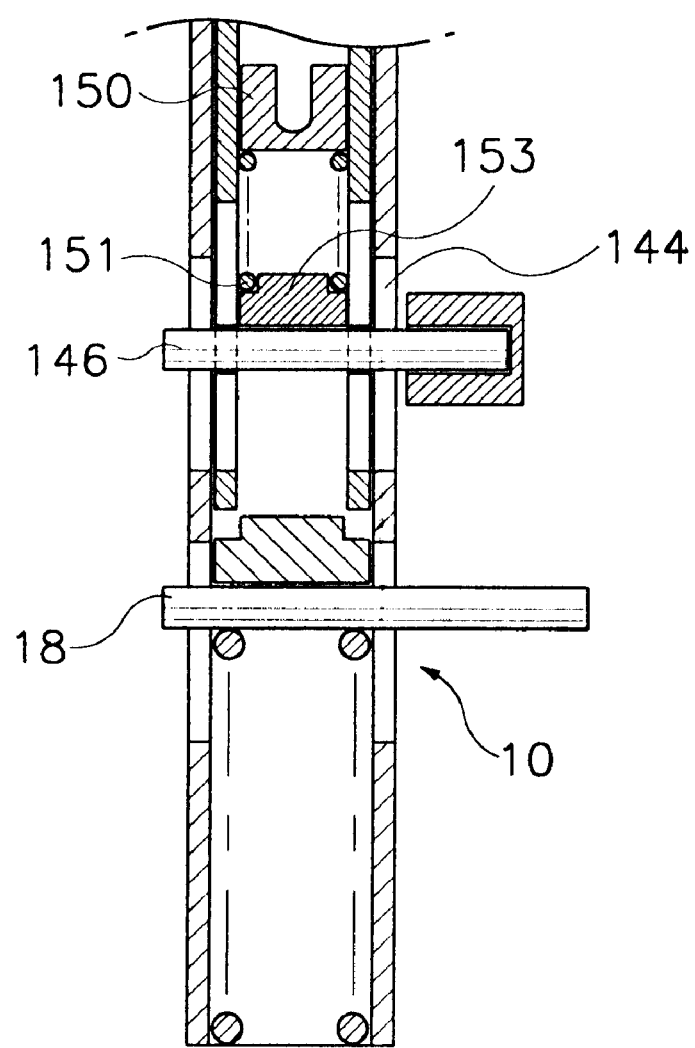
FIG. 4 is a sectional view taken along line I—I of FIG. 3.

Of course, as illustrated in FIG. 4, the lock pin 146 is guided by a slot 144 at the selector lever 10 so as to be moved upwardly by the release lever 124 of the lock release means 120 and to be moved downwardly by the resilience of the resilient member 151.

It should be noted that the lock pin 146 may be coupled by a roller or a cap slidable along an upper surface of the detent plate 22 after being lifted up on the release lever 124.

Next, an operational effect of the present invention thus constructed will be described.

First of all, a driver applies a predetermined amount of depressing force to the brake pedal 32 in order to shift the selector lever 10 from a parking position (P) to a neutral position (N). At this time, the lock release means 120 connected at the other end of the cable 122 connected at one end thereof to the brake pedal 32 is actuated to upwardly push up the lock pin 146 engaged to the first engagement hole 141 at the detent plate 22, thereby releasing an engaged state between the first engagement hole 141 and the lock pin 146.

Figure 3:
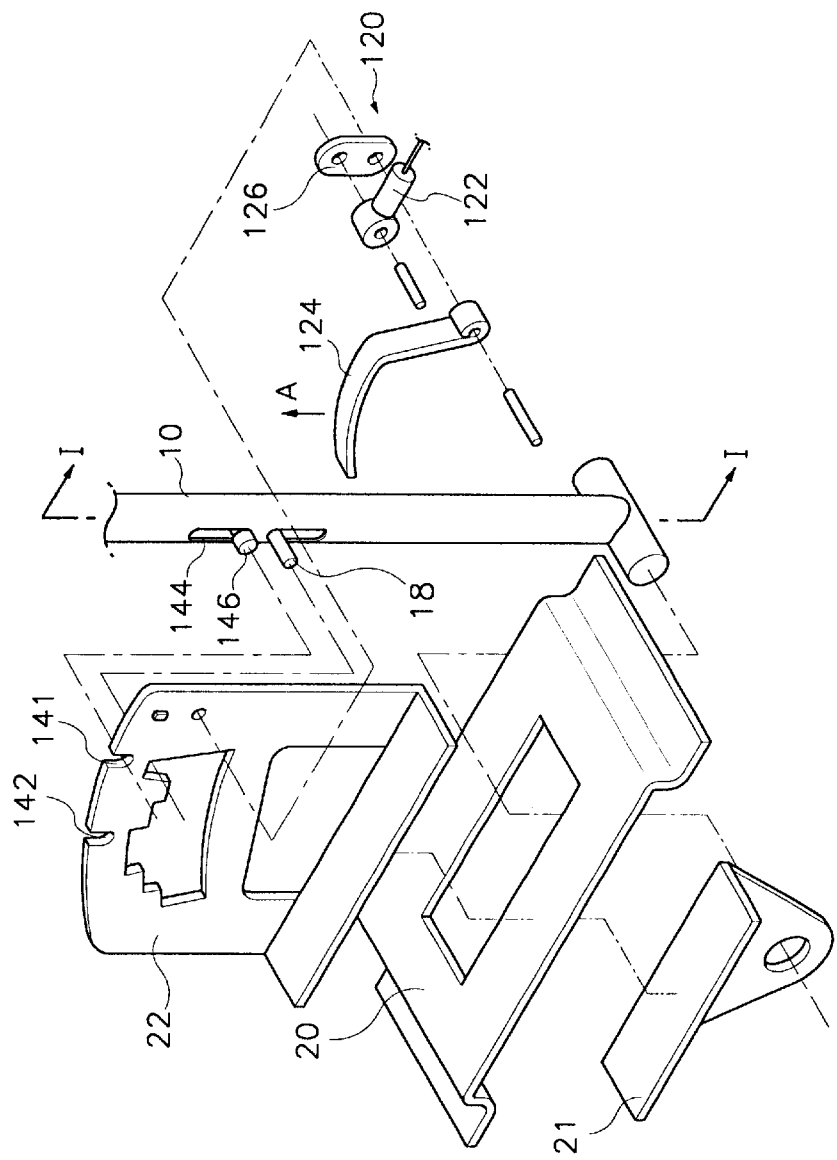
FIG. 3 is a perspective view of an exploded shift lock device according to the present invention.

In other words, when the lock release means 120 is actuated, the release lever 124 is moved toward an arrow direction (A) in FIG. 3 to push up the lock pin 146 and to release the engaged state between the first engagement hole 141 and the lock pin 146, such that the selector lever 10 can be shifted from the parking position (P) to the neutral position (N).

Meanwhile, when the driver applies a predetermined amount of depressing force to the brake pedal 32 in order to shift the selector lever 10 from the neutral position (N) to the parking position (P) or to the drive position (D), which is a vehicle starting situation different from that of the abovementioned, the lock release means 120 is actuated to upwardly push up the lock pin 146 engaged to the second engagement hole of the detent plate 22, thereby releasing an engaged state between the second engagement hole 142 and the lock pin 146.

In other words, just like the selector lever 10 being shifted from the parking position (P) to the neutral position (N), when the lock release means 120 is actuated, the release lever 124 at the lock release means 120 is moved to an arrow direction in FIG. 3 to lift the lock pin 146 and to release the engagement between the second engagement hole 142 and the lock pin 146, thereby enabling the selector lever 10 to be shifted from the neutral position (N) to the parking position (P).

In other words, the selector lever 10 cannot be shifted from the parking position (P) to the neutral position (N), or from the neutral position (N) to the parking (P) or drive position (D) only when the brake pedal 32 is not depressed, such that occurrence of sudden acceleration can be prevented in advance.

As apparent from the foregoing, there is an advantage in the shift lock device for vehicle thus described according to the present invention in that a shifting from P to N or from N to other positions (P or N) is easily locked by a simpler structure than the conventional device to thereby reduce the cost and to improve productivity.

The present invention is not intended to be limited to the embodiment disclosed but is disclosed only as an example.

By way of example, the invention can be embodied by a construction where an actuator is coupled to one side of the selector lever and a lock pin that is moved sideways by the actuator instead of upward/downward directions as shown in the present embodiment is equipped to thereby allow engaging to an engagement coupling portion of the detent plate.

As mentioned above, the invention may be embodiment in other specific forms without departing from the spirit of essential characteristics thereof. The present embodiment is therefore to be considered in all respects as illustrative and not restrictive, the scope of the invention being indicated by the appended claims rather than be the foregoing description and all changes which come within the meaning and range of equivalency of the claims are therefore intended to be embraced therein.

What is claimed is:

1. A shift lock device for a vehicle having a transmission shiftable between park, reverse, neutral, and drive transmission modes of operation, the device allowing shifting out of the park and neutral modes of operation only upon depression of a brake pedal, the device comprising:

a selector lever shiftable between the transmission modes of operation;

a brake pedal;

first and second engagement holes formed in a detent plate, wherein the first engagement hole corresponds to the park mode of operation and the second engagement hole corresponds to the neutral mode of operation;

a lock pin disposed on the selector lever, the lock pin being movable between an engaged position and a released position such that the lock pin may engage one of the first and second engagement holes when the selector lever is in a position for selecting one of the park and neutral transmission operating modes;

means for biasing the lock pin to the engaged position, wherein the lock pin engages one of the first and second engagement holes, when the selector lever is in position for selecting one of the park and neutral operating modes, and further wherein the selector lever is locked in position when the lock pin is engaged in the engagement holes;

a lock release means for moving the lock pin to the released position when the brake pedal is depressed, wherein the selector lever may be shifted out of one of the park and neutral modes of operation;

the lock release means comprising:

a cable, the cable connected at one end to the brake pedal;

a lock pin release lever;

a connecting member, the connecting member being pivotably attached to the detent plate, one end of the connecting member being connected to the brake cable, the other end being hinged to the release lever; and wherein upon depression of the brake pedal, the brake cable pivotably actuates the connecting member, the connecting member rotating the release lever upwardly, the release lever pushing the lock pin out of one of the first and second engagement holes thereby releasing the selector lever for shifting to another mode of operation.

2. The shift lock device of claim 1, wherein the release lever is made of a resilient material.

3. The shift lock device of claim 1, wherein the selector lever includes:

a hollow lever incorporating a slot, the lock pin being slidably movable within the slot;

a movable member slidably movable within the selector lever disposed above and adjacent to the lock pin;

a supporting member fixed within the selector lever at a preselected interval above the movable member; and a resilient member disposed between the movable member and the fixed member, wherein the resilient member biases the lock pin to the engaged position.

4. A shift lock device for a vehicle having a transmission shiftable between park, reverse, neutral, and drive transmission modes of operation, the device allowing shifting out of the park and neutral modes of operation only upon depression of a brake pedal, the device comprising:

a selector lever shiftable between the transmission modes of operation;

a brake pedal;

a detent plate, the detent plate includng first and second engagement holes, wherein the first engagement hole corresponds to the park mode of operation and the second engagement hole corresponds to the neutral mode of operation;

a lock pin disposed on the selector lever, the lock pin being movable between an engaged position and a released position such that the lock pin may engage one of the first and second engagement holes when the selector lever is in a position for selecting one of the park and neutral transmission operating modes;

a resilient member for biasing the lock pin to the engaged position, wherein the lock pin engages one of the first and second engagement holes, when the selector lever is in position for selecting one of the park and neutral operating modes, and further wherein the selector lever is locked in position when the lock pin is engaged in the engagement holes;

a lock release assembly for moving the lock pin to the released position when the brake pedal is depressed, wherein the selector lever may be shifted out of one of the park and neutral modes of operation;

the lock release assembly comprising:

a cable, the cable connected at one end to the brake pedal;

a lock pin release lever;

a connecting member, the connecting member being pivotably attached to the detent plate, one end of the connecting member being connected to the brake cable, the other end being hinged to the release lever; and wherein upon depression of the brake pedal, the brake cable pivotably actuates the connecting member, the connecting member rotating the release lever upwardly, the release lever pushing the lock pin out of one of the first and second engagement holes thereby releasing the selector lever for shifting to another mode of operation.

\* \* \* \* \*